US 12,321,865 B2

(12) United States Patent
Zhang

(10) Patent No.: US 12,321,865 B2
(45) Date of Patent: Jun. 3, 2025

(54) EVENT PREDICTION BASED ON MULTIMODAL LEARNING

(71) Applicant: Salesforce, Inc., San Francisco, CA (US)

(72) Inventor: Yang Zhang, Arlington, MA (US)

(73) Assignee: Salesforce, Inc., San Francisco, CA (US)

( * ) Notice: Subject to any disclaimer, the term of this patent is extended or adjusted under 35 U.S.C. 154(b) by 908 days.

(21) Appl. No.: 17/157,832

(22) Filed: Jan. 25, 2021

(65) Prior Publication Data

US 2022/0237480 A1 Jul. 28, 2022

(51) Int. Cl.
*G06N 5/04* (2023.01)
*G06F 18/214* (2023.01)
*G06F 18/25* (2023.01)
*G06N 3/08* (2023.01)
*G06N 20/00* (2019.01)

(52) U.S. Cl.
CPC ............ *G06N 5/04* (2013.01); *G06F 18/214* (2023.01); *G06F 18/25* (2023.01); *G06N 20/00* (2019.01); *G06N 3/08* (2013.01)

(58) Field of Classification Search
CPC ............ G06N 5/04; G06N 20/00; G06N 3/08; G06N 3/045; G06F 18/25; G06V 10/82
See application file for complete search history.

(56) References Cited

U.S. PATENT DOCUMENTS

| | | | | |
|---|---|---|---|---|
| 2012/0278336 | A1* | 11/2012 | Malik | G06F 40/289 707/748 |
| 2020/0410721 | A1* | 12/2020 | Farri | G16H 50/20 |
| 2021/0012770 | A1* | 1/2021 | Choudhary | G06F 3/0484 |
| 2021/0253255 | A1* | 8/2021 | Johnson | B60R 22/48 |
| 2022/0019867 | A1* | 1/2022 | Wang | G06N 3/04 |
| 2022/0291966 | A1* | 9/2022 | Masood | G06F 3/0486 |

OTHER PUBLICATIONS

Agrawal, et al., "VQA: Visual Question Answering," 2016, arXiv:1505.00468 (Year: 2016).*
Liu et al., "Sequential Behavior Molding for Next-Video Recommendation with Collaborative Transformer," 2019 IEEE International Conference on Multimedia and Expo (Year: 2019).*
Chen et al., "Behavior Sequence Transformer for E-commerce Recommendation in Alibaba," 2019, arXiv:1905.06874v1 (Year: 2019).*

* cited by examiner

*Primary Examiner* — Michael J Huntley
*Assistant Examiner* — Vincent Anton Spraul
(74) *Attorney, Agent, or Firm* — Holland & Hart LLP

(57) ABSTRACT

Methods, systems, and devices for data processing are described. According to the techniques described herein, a sequential model may be trained using data of different modalities to be used for event recommendation or prediction for an entity or attendee of a future event. Encoders may be used to encode entity data and event data of different data types, and the encoded data may be used to generate vectors for input to a multimodal Transformer. A segment mask may be generated for each of a set of vectors corresponding to the entity and a set of vectors corresponding to an event sequence associated with the entity. The segment masks and sets of vectors may be used to generate embeddings to train the sequential model.

20 Claims, 10 Drawing Sheets

EVENT PREDICTION BASED ON MULTIMODAL LEARNING

FIELD OF TECHNOLOGY

The present disclosure relates generally to database systems and data processing, and more specifically to event prediction based on multimodal learning.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

Organizations may host events that have a variety of different sessions available for an attendee. Information related to the events, attendees, and sessions may be used by marketers to distribute content. The various information related to the events and attendees may take a variety of forms including text, photography, video, audio, graphical relationships, and the like. As such, conventional systems used for marketing may be unable to utilize some or all of the information related to the events, attendees, and sessions.

DETAILED DESCRIPTION

Figure 1:
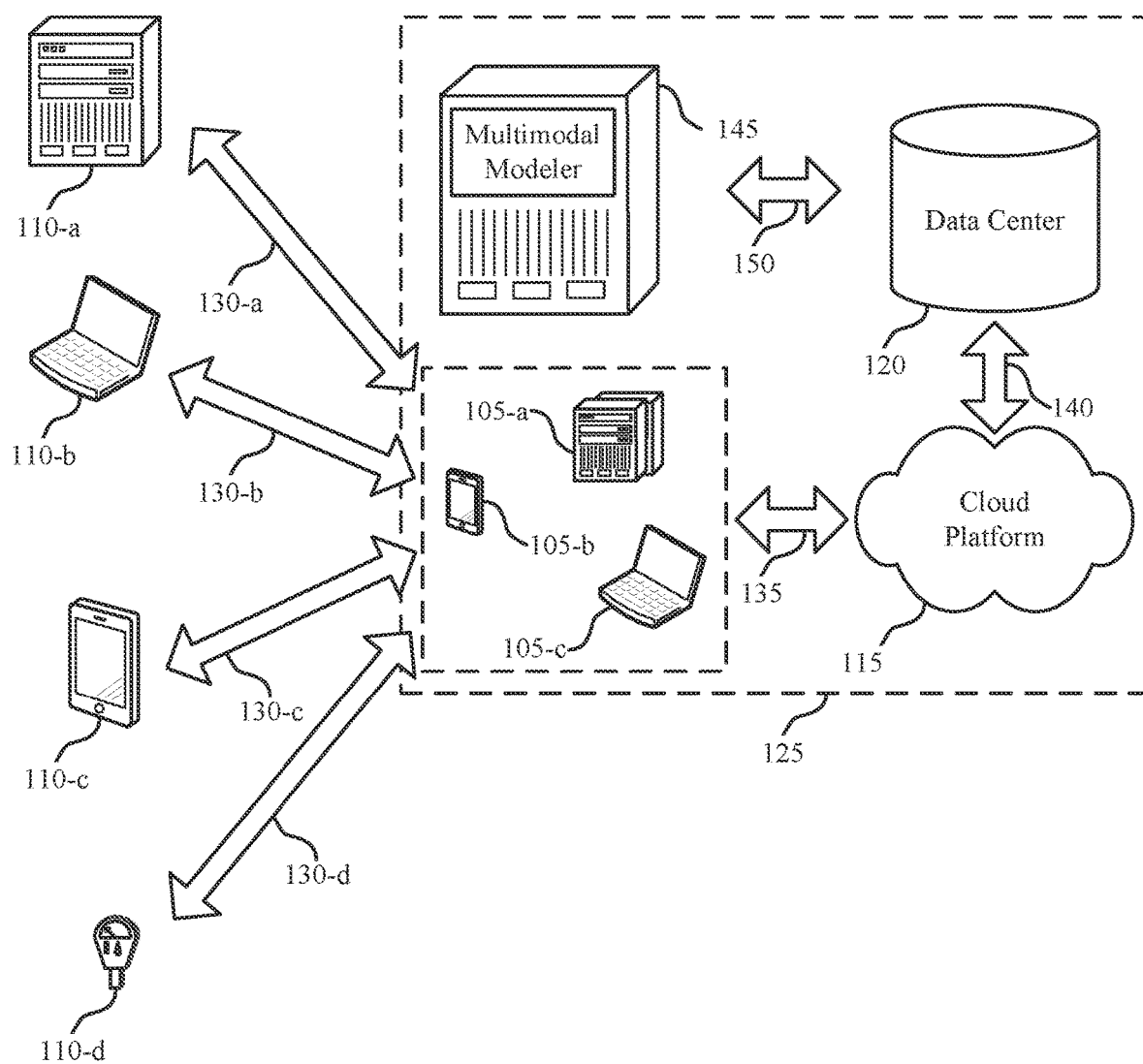
FIG. 1 illustrates an example of a system for cloud computing that supports event prediction based on multimodal learning in accordance with aspects of the present disclosure.

Organizations, such as companies or academic institutions, may host events (conferences, conventions, seminars, etc.) that have a variety of different sessions available for an attendee. The events, attendees, and sessions may each be associated with data of multiple data types or modalities (e.g., text, images, numeric), and not all data types may be available for each attendee, event, or session within an event. Further, the formatting of the different types of data may be irregular or unformatted, and may vary across different events, which may introduce inconsistencies and complexity when attempting to process and analyze the data. Conventional event recommendation techniques may be designed to only handle a limited amount of data or data types (e.g., a single type of data), and in cases where there is no data of a given type available for an attendee or event, which may be referred to as a missing data problem, conventional event recommendation techniques may fail or otherwise be unable to process the data, which may lead to inaccurate recommendations, ineffective marketing campaigns for future events, poor customer loyalty, or other issues.

Techniques described herein support a multimodal modeler that predicts suitable events (e.g., next events or future events) or sessions of an event for an attendee, which may be used by marketers for distributing and generating marketing content for the attendee (e.g., for a future event). The techniques herein utilize multimodal data associated with the attendee, which may be referred to as an entity, and optionally, events previously attended by the attendee to recommend an event or a session within an event for the attendee, or to predict a next event for the attendee. The multimodal modeler may encode data of different types associated with an attendee to obtain sets of vectors that each have the same dimension. A segment mask may be used to differentiate the modalities of the sets of vectors and indicate to which data type each of the sets of vectors corresponds and, along with the sets of vectors, may be used as input to a multimodal Transformer to generate an embedding for the entity. Similar encoding techniques may be performed for multimodal data associated with a given event or sequence of events attended by the attendee. A sequential model may be trained using the embeddings that are generated by the multimodal Transformer using entity or event data. Such techniques for training and utilizing a sequential model may provide accurate prediction of an event or session(s) within an event for an attendee through the use of multimodal data associated with the attendee and optionally, multimodal data associated with a sequence of events attended by the attendee.

In some aspects, data output from an encoder (e.g., an n-dimension vector) may be of a different dimension than that which is supported by the multimodal Transformer used to generate embeddings for training the sequential model. In such instances, the data output from the encoder may be normalized such that each vector subset input into the multimodal Transformer is of the same dimension. To differentiate between modalities of data associated with an entity or data associated with a set of events (e.g., an event sequence associated with an entity), respective segment masks may be generated for each of an entity multimodal model and, optionally, an event multimodal model. The segment mask may correspond to one or more vectors (e.g., of the entity or of the set of events) to be used as input to the multimodal model, and may include different values for each subset of the one or more vectors that is dependent on the modality of the subset. Once generated, the segment mask(s) may be input to the multimodal Transformer and used by the multimodal Transformer to differentiate between modalities, which may provide accuracy and consistency in the embeddings output from the multimodal Transformers. If data of a given modality is unavailable, an empty vector is generated having a same dimension as the dimension of the sets of vectors used as input to the multimodal Transformer. The embeddings output from the multimodal Transformer may be used to train the sequential model, and once trained, the sequential model may be used to predict or recommend events or sessions for a given attendee, company, etc., which organizations may use for marketing purposes (e.g., for marketing a given session or event to an attendee or company or recommending one or more sessions for an attendee at an event).

Aspects of the disclosure are initially described in the context of an environment supporting an on-demand database service. Aspects of the disclosure are further described with respect to a general system diagram that supports multimodal data processing and event prediction, and data flows that support sequential model training, which may be used for event recommendation in accordance with the techniques herein. Aspects of the disclosure are further illustrated by and described with reference to apparatus diagrams, system diagrams, and flowcharts that relate to event prediction based on multimodal learning.

FIG. 1 illustrates an example of a system 100 for cloud computing that supports event prediction based on multimodal learning in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The cloud platform 115 may support a segmentation application accessible at one or more of the cloud clients 105. The segmentation application may be utilized to identify segments of entity identifiers based on attributes associated with entities identifiers. A user of a cloud client 105 may utilize the application to identify a segment of entities to receive a content item (e.g., marketing content).

Some systems may be utilized for event recommendation for an attendee or customer (e.g., an entity) or for recommending sessions within an event for an attendee or customer. Such event recommendation techniques are associated with several challenges. For example, entities, events, and sessions within events may have data of multiple data types or modalities, such as numeric, text, images, and not all data types may be available for every entity or event. Further, available data may be irregularly formatted (e.g., numeric and text may be in structured database tables or raw paragraphs, images may be static or in videos), and formats differ between different events. The multimodal nature of the data and the potential for missing data may introduce complexity or difficulty, and systems used for processing these data may fail, may be unable to utilize all the available data, or may otherwise result in inaccurate event prediction or recommendation.

Aspects of the disclosure described herein support event recommendation using multimodal data associated with an entity, event, or session within an event, and may be capable of data processing and accurate recommendation in the case of missing data (e.g., missing data of a given type). For example, subsystem 125 may include a multimodal modeler 145 configured to communicate with data center 120 (or other data store) using network connection 150. The multimodal modeler 145 may utilize multimodal data associated with an entity, an event, sessions within an event, an event sequence of the entity, or any combination thereof to predict a next event for a customer or potential attendee at a future event. In some examples, the multimodal modeler 145 may access multimodal data stored at the data center 120 using network connection 150, and the multimodal modeler may use the multimodal data to train a sequential model for event prediction. Once trained, the sequential model may be used to predict a next event or recommend sessions within an event for an entity or customer. For example, multimodal data associated with an entity or customer may be input to the trained sequential model, and the trained sequential model may output a next event for the entity or customer, or may recommend sessions within an event for the entity or customer. Information related to the next event or recommended sessions within an event may be used by organizations or marketers to improve attendance at future events, improve customer experience at a planned or ongoing event (e.g., through session recommendations), which in turn improves customer engagement and loyalty.

In one example, an individual may be associated with multimodal data such as text data including background information, introduction, education, etc., numeric data including years in an given industry, age, etc., graphical relationship data including the individual's interactions with companies or on social media, or categorical data including job role, industry, etc. An individual may also have previously attended a number of conferences, each of which may be associated with multimodal data such as images or videos from marketing materials used for marketing the conference(s), text data such as event introductions or abstracts of the sessions within an event, etc. Using the techniques herein, this multimodal data, which may be disorganized and of different formats and modalities, may be input into the multimodal modeler 145, and the multimodal modeler 145 may predict a next event for the individual, or recommend sessions within an event that the individual is attending or planning on attending. Organizations or marketing teams may use the predicted next event information for marketing upcoming events or sessions to the individual, or the individual may choose to attend one or more of the sessions recommended to the individual, which may result in higher attendance rates at conferences, improved experience at an event for the individual, among other benefits.

It should be appreciated by a person skilled in the art that one or more aspects of the disclosure may be implemented in a system 100 to additionally or alternatively solve other problems than those described herein. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
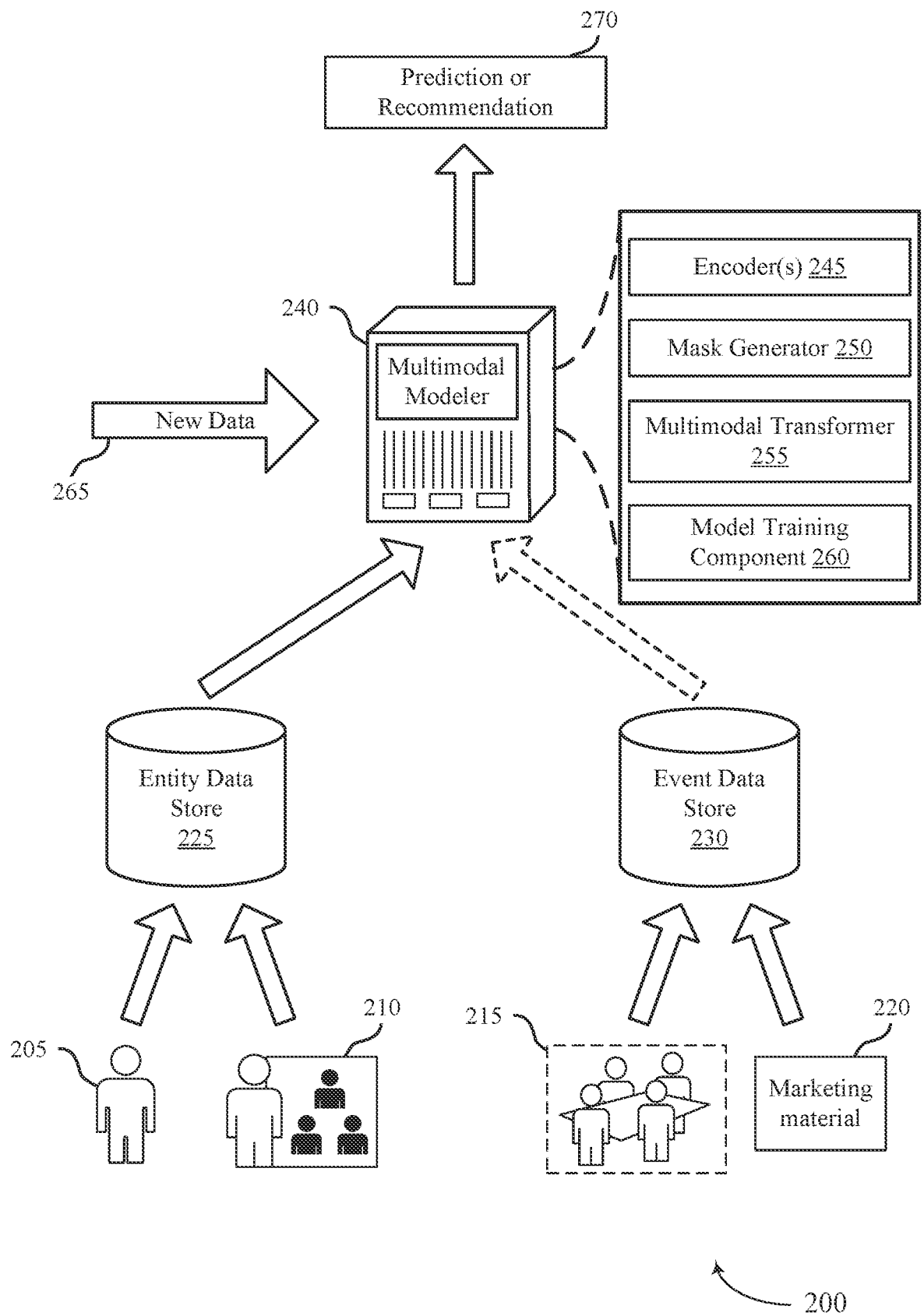
FIG. 2 illustrates an example of a data processing system that supports event prediction based on multimodal learning in accordance with aspects of the present disclosure.

FIG. 2 illustrates an example of a data processing system 200 that supports event prediction based on multimodal learning in accordance with aspects of the present disclosure. The data processing system 200 includes an entity data store 225, an event data store 230, and a multimodal modeler 240. The data processing system 200 may implement aspects of the system 100 as described with reference to FIG. 1. For example, the entity data store 225, the event data store 230, or both may be examples or components of a data center 120, and the multimodal modeler 240 may be an example of a multimodal modeler 145.

The data processing system 200 may support event recommendation (or session recommendation) based on multimodal data. For example, an entity, such as an individual 205 or a company 210, may be considered by an organization (e.g., an academic institution or company that hosts events) to be a customer, an attendee at an event (e.g., an already planned event), or a potential attendee (e.g., an attendee at a future event). The entity may be associated with multimodal data. For instance, an individual 205 may be associated with multimodal data including text, such as an introduction that includes information (e.g., education, background, interests, experience) about the individual 205 or posts associated with the individual (e.g., social media posts, contributions, or publications). The individual 205 may also have structured categorical data that may be used for categorization. For instance, the individual 205 may be associated with a given industry, a job role, or job title, among other information about the individual 205. The individual 205 may, in some cases, be associated with numeric data (e.g., age, number of years in a given industry, years of expertise), or may be associated with graphical relationship data, such as a relational network based on interaction of the individual 205 (e.g., the relationship of the individual 205 within a given company or organization, whether the individual 205 follows, likes, or replies to given social media posts, people, companies, or other information).

An entity may also be a company 210, which may be a group of customers (e.g., multiple individuals 205), businesses, or business segments, among others, and the groups may be hierarchical, which may differ in size and shape across different groups. The company 210 may be associated with multimodal data. For instance, the company 210 may include text (e.g., company vision or statement, company background information), numeric (e.g., number of years in a given industry), or graph data (company 210 industry or relationship to competitors, business deals with customers of the company 210, or interactions or media presence relative to other companies 210). The multimodal data associated with the entity (e.g., individual 205 or company 210) may be aggregated and stored on an entity data store 225, which may be part of or in connection with a cloud platform as described with reference to FIG. 1

According to some aspects, an event may be associated with multimodal data. For example, a session 215 of an event or marketing materials 220 for an event may be associated with text data, such as an event introduction or an abstract for a given session. The session 215 or marketing materials 220 may be associated with image data, such as images included in presentations of a given session 215 or images within marketing materials 220 such as brochures, newsletters, social media posts, etc. In some cases, the session 215 or marketing materials 220 may have video data such as a transcript (e.g., text) and sample screenshots of the video (e.g., images). Events may be hierarchical or stand-alone. For example, an event may be a single event planned by an organization or may be associated with a track that includes a series of sessions or set of events (e.g., sessions or events of increasingly advanced topics).

In some examples, event data may be gathered for entities (e.g., individual 205 or company 210), such as data related to events previously attended by an entity. The event data may be sequential in nature, and the order of attendance may be taken into consideration when aggregating or gathering the event data. For example, a customer may attend events of increasingly advanced topics as time passes and the event sequence (e.g., the events attended by the customer or entity in order of time) may be gathered. The event data associated with an entity (e.g., the event sequence corresponding to the events attended by an entity over time), the event data relating to sessions 215 of an event or marketing material 220 for an event may be gathered and stored on event data store 230, which may be which may be part of or in connection with a cloud platform as described with reference to FIG. 1.

A multimodal modeler 240 may include one or more encoders 245, a mask generator 250, a multimodal Transformer 255, and a model training component 260, among other components. The multimodal modeler 240 may be used to model an entity and a set of one or more events corresponding to the entity, which may be used to train a sequential model for event prediction or session recommendation. Entity data and, optionally, event data, which may be multimodal, may be input to the multimodal modeler 240. For example, entity data stored at the entity data store 225 or event data stored at the event data store 230 may be input to the multimodal modeler 240. The one or more encoders 245 of the multimodal modeler 240 may encode the input data to generate vectors that may be used for generating embeddings corresponding to the entity or an event and train a sequential model using the model training component. The encoders 245 may be used to generate vectors of a given data type (e.g., numeric (float), or text (string)) having the same dimension that is supported by the multimodal Transformer 255.

The mask generator 250 may generate a mask for a set of vectors corresponding to multimodal data associated with the entity, and may generate a mask for a set of vectors corresponding to multimodal data associated with the event. Each mask may include a set of values (e.g., integer values) such that each value is assigned to a vector of the set of vectors, and is representative of a given modality that corresponds to the data type of the input data used to generate the vector. For example, a value of '0' may be assigned to an entity vector associated with a text data type (e.g., a first modality), a value of '1' may be assigned to an entity vector associated with a numeric data type (e.g., a second modality), and a value of '2' may be assigned to an entity vector of a graphical relationship type (e.g., a third modality), and so on.

For the segment mask for the set of vectors corresponding to an event, a similar assignment procedure may be performed such that a given value of the segment mask for an event vector of the set of vectors corresponding to the event may correspond to a given modality of the input data used to generate the event vector.

The segment mask(s) generated by the mask generator 250 may be input to a multimodal Transformer 255, together with the set of vectors for the entity or event. For instance, the segment mask for the entity may be input to the multimodal Transformer 255 along with the set of vectors corresponding to the entity, as generated by the one or more encoders 245, and the multimodal Transformer 255 may generate a set of embeddings corresponding to the entity. Additionally, or alternatively, the segment mask for the event or event sequence attended by the entity may be input to the multimodal Transformer 255 along with the set of vectors corresponding to the event, as generated by the one or more encoders 245, and the multimodal Transformer 255 may generate a set of embeddings corresponding to the event. The multimodal Transformer 255 may be a type of encoder used to model an entity and to model the sequence of events attended. In some examples, the multimodal Transformer 255 is a language model and events are treated as or represented by tokens (e.g., a portion of a string or embedding), and sequences of events attended by an entity are treated as or represented by sentences. For each sequence, an entity embedding may be used as the first token in the sentence, followed by one or more event embeddings representative of the event(s) attended by the entity.

The entity embeddings and the corresponding event embeddings may be input to the model training component 260, and the model training component may generate a sequential model that may be used for event prediction or recommendation. In some cases, a next-event prediction task may be used by the model training component 260 to train the sequential model.

Once trained, new data 265 may be input to the multimodal modeler 240 for event prediction or session recommendation. The new data 265 may include data (e.g., multimodal data) corresponding to an entity (e.g., a new customer or potential customer for a future event or planned event), and may optionally include event data for the entity, such as an event sequence indicate of a set of events previously attended by the entity. The new data 265 may be input into the sequential model trained by the multimodal modeler 240, and the sequential model may generate a next event for the entity at 270, which may be a next event recommended to be attended by the entity, one or more sessions within an event recommended to be attended by the entity, a next event or session of an event track recommended to be attended by the entity, or a combination thereof.

Event prediction based on the techniques herein including the multi-hierarchy sequences may provide increased flexibility and coverage. For flexibility, the event predication enables recommendations of entire events to organizations, or recommendations of detailed tracks to individual customers. For coverage, it provides accurate and targeted recommendation to new customers (e.g., of existing organizations) based on organization level models, which may be used by marketers for generating marketing material for a future event, targeted advertising for an individual or entity, among other benefits. Further, in accordance with the event prediction techniques herein, new customers (e.g., individuals 205 or companies 210) with no previous attendance history may receive accurate recommendations for events or sessions within an event.

Figure 3:
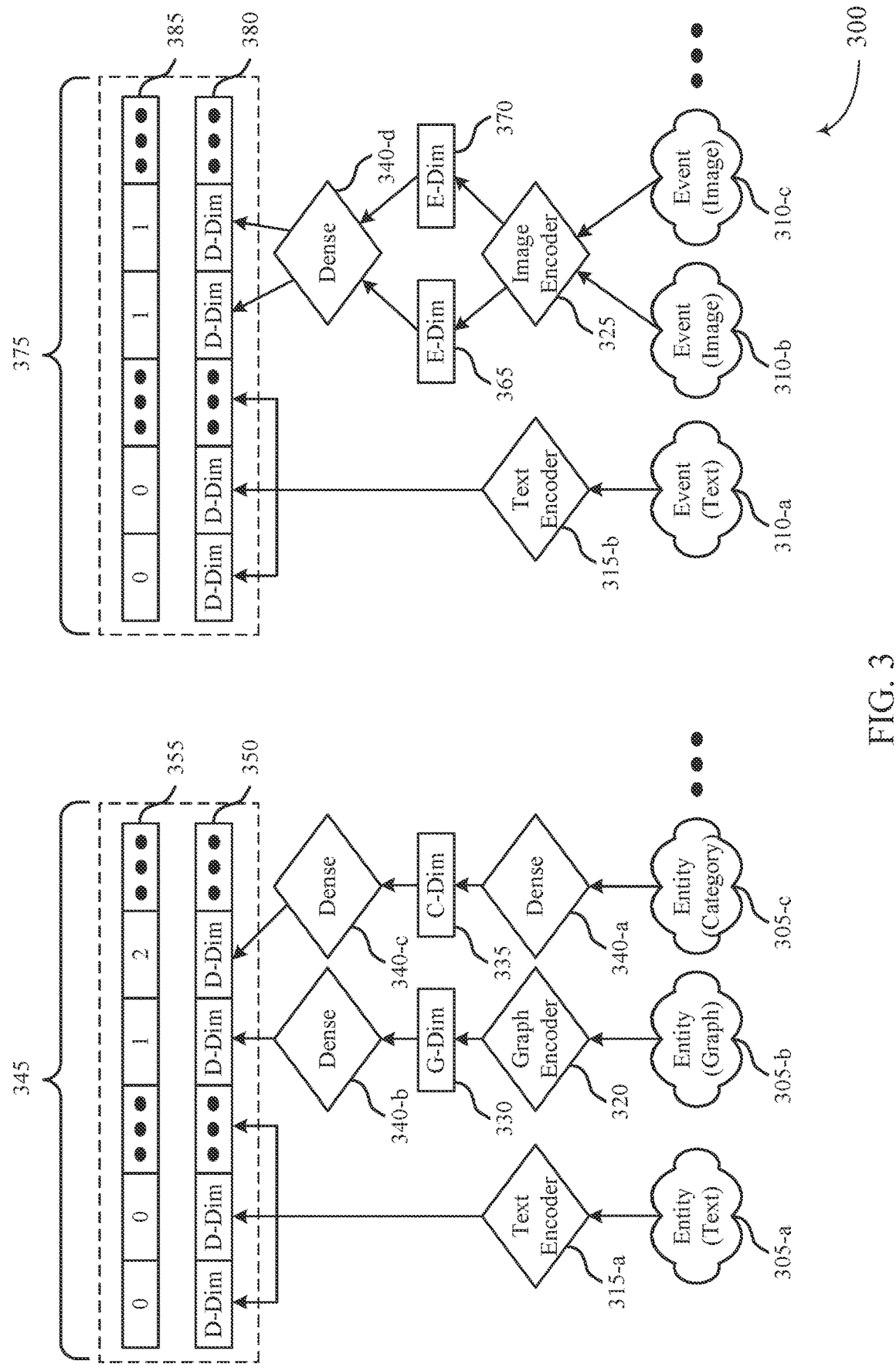
FIG. 3 illustrates an example of a data flow diagram that supports event prediction based on multimodal learning in accordance with aspects of the present disclosure.

FIG. 3 illustrates an example of a data flow diagram 300 that supports event prediction based on multimodal learning in accordance with aspects of the present disclosure. The data flow diagram 300 may implement aspects of the system 100 or the data processing system 200, as described with reference to FIGS. 1 and 2. For example, the data flow diagram 300 may represent techniques performed by a multimodal modeler, such as multimodal modeler 240 of FIG. 2, or a multimodal modeler 145 of FIG. 1.

Data flow diagram 300 may support multimodal data for training a sequential model for event prediction using multimodal data associated with an entity, an event, or both. An entity may have multimodal data 305, such as entity text data 305-$a$, entity graph data 305-$b$, entity category data 305-$c$, among others (numeric, etc.), and an event may have multimodal data 310, such as event text data 310-*a*, and event image data 310-*b* and 310-*c*. The multimodal data 305 of the entity and the multimodal data 310 of the event may have data associated with different formats, may have missing data of a given modality, may be of different dimensions, etc. Multimodal data 305 of the entity can apply to individual customers and customer organizations (e.g., companies, businesses), and multimodal data 310 of the event may apply to events, tracks, and sessions.

For text (e.g., entity text data 305-*a* and event text data 310-*a*), a text encoder 315 is used to encode the text data. For example, text encoders 315 may encode entity text data 305-*a* or the event text data 310-*a* to generate one or more embeddings of a given dimension (e.g., D-dimension) to be included in a set of vectors 350 for multimodal modeling of the entity or in a set of vectors 380 for multimodal modeling of the event, respectively. The text encoders 315 may be multi-language self-attention neural network models, such as an XLMR model, that may be trained using various data. For example, the text encoders 315 may be trained using publicly available data (e.g., data available from the Internet or web), and may be additionally trained using previously known or available text data associated with the entity or event. The text encoder 315-*a* may use entity text data 305-*a* as input to generate a sequence of P embeddings, where each embedding is D-dimensional. Additionally, or alternatively, text encoder 315-*b* may be used to encode event text data 310-*a* as input to generate a sequence of M embeddings, where each embedding is D-dimensional.

In some aspects, entity graph data 305-*b* may correspond to a customer of an organization that may form relational networks (e.g., graphs) based on entity interaction. A graph encoder 320 may be used to encode the entity graph data 305-*b* into one or more embeddings, such as embedding 330, where each embedding is G-dimensional. In some examples, the graph encoder 320 may be a graph neural network, which may be trained on the available graphical relationship data.

For image data (e.g., event image data 310-*b* and 310-*c*), one or more image encoders 325 may be used. For example, image encoder 325 may be a convolutional neural network model, such as an EfficientNet model, and may encode event image data 310-*b* and 310-*c*. The convolutional neural network model may be trained on an ImageNet dataset, to encode both event image data 310-*b* and 310-*c* into sequences of N embeddings, such as embedding 365 and embedding 370, where each embedding is E-dimensional.

After encoding, the embeddings may be normalized before being included in a set of vectors for each of the entity multimodal model and the event multimodal. For example, a Dense neural network model 340 may be used to encode embeddings of a given dimension into a D-dimensional embedding (or other dimensional embedding supported for training a sequential model). For example, dense neural network model 340-*a* may encode each categorical data point of the entity category data 305-*c*, and generate an embedding 335 that is C-dimensional. A dense neural network model 340-*b* may encode embedding 330 having G-dimension into an embedding of a D-dimension that is included in the set of vectors 350. Dense neural network model 340-*c* may encode embedding 335 having C-dimension into an embedding of a D-dimension that is included in the set of vectors 350. Dense neural network model 340-*d* may encode embeddings 365 and 370, each having E-dimension into respective embeddings of D-dimension that are included in the set of vectors 380.

Additionally, or alternatively, a segment mask 355 for the entity may be generated having values for each vector subset (e.g., embeddings) of the set of vectors 350 depending on the modality to which the vector subset corresponds. For example, vector subsets associated with text data types for the entity may be assigned a '0' value, vector subsets associated with graphical relationship data types for the entity may be assigned a '1' value, and vector subsets associated with image data types for the entity may be assigned a '2' value, and so on for different modalities of the entity multimodal data 305. A segment mask 385 for the event may be generated having values for each vector subset (e.g., embeddings) of the set of vectors 380 depending on the modality to which the vector subset corresponds. For example, vector subsets associated with text data types for the event may be assigned a '0' value, vector subsets associated with image data types for the entity may be assigned a '1' value, and so on for different modalities of the event multimodal data 310.

Together with the sets of vectors (e.g., set of vectors 350 corresponding to the entity and set of vectors 380 corresponding to the event), the segment masks 355 and 385 may be used as input for generating training vectors to train a sequential model. For example, segment mask 355 and the set of vectors 350 for the entity may represent input vectors 345 associated with the entity multimodal model, and segment mask 385 and the set of vectors 380 for the event may represent input vectors 375 associated with the event multimodal model.

Figure 4:
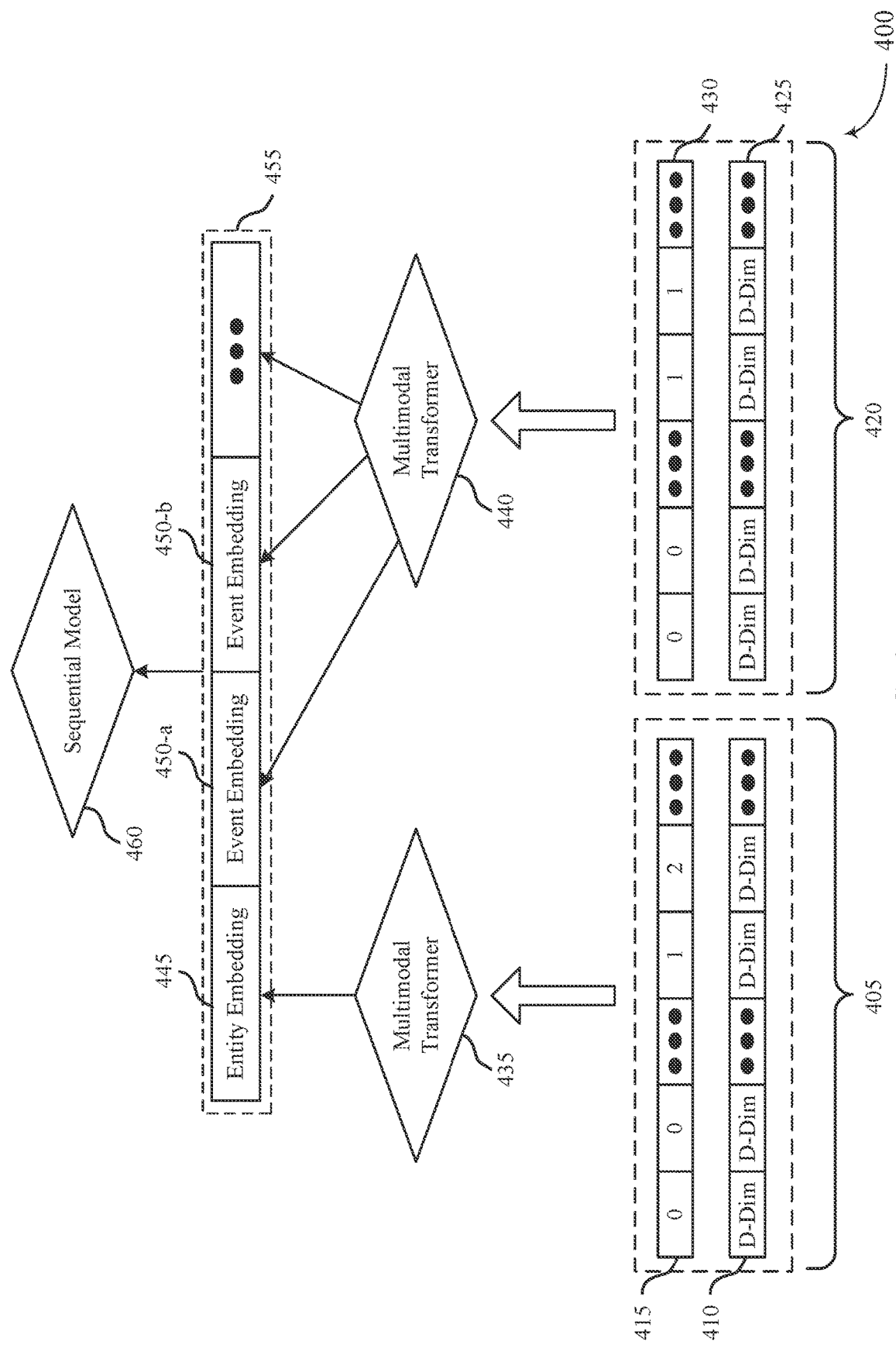
FIG. 4 illustrates an example of a data flow diagram that supports event prediction based on multimodal learning in accordance with aspects of the present disclosure.

FIG. 4 illustrates an example of a data flow diagram 400 that supports event prediction based on multimodal learning in accordance with aspects of the present disclosure. The data flow diagram 400 may implement aspects of the system 100 or the data processing system 200, as described with reference to FIGS. 1 and 2, or the data flow diagram 300, as described with reference to FIG. 3. For example, the data flow diagram 300 may represent techniques performed by a multimodal modeler, such as multimodal modeler 240 of FIG. 2, or a multimodal modeler 145 of FIG. 1, or techniques of data flow diagram 300.

Data flow diagram 400 may support multimodal data for training a sequential model for event prediction using multimodal data associated with an entity, an event, or both. An entity may have multimodal data and an event may have multimodal data, which may be used to generate input vectors, such as input vectors 405 corresponding to an entity and input vectors 420 corresponding to an event. For example, input vectors 405 may include a first set of vectors 410 that includes multiple vectors subsets of the same dimension (D-dimension), and a first segment mask 415 corresponding to the first set of vectors. The input vectors 405 may be an example of input vectors 345 of FIG. 3, the first set of vectors may be an example of the set of vectors 350 of FIG. 3, and the first segment mask 415 may be an example of the segment mask 355 of FIG. 3. Input vectors 420 may include a second set of vectors 425 that includes multiple vectors subsets of the same dimension (D-dimension), and a second segment mask 430 corresponding to the second set of vectors. The input vectors 420 may be an example of input vectors 375 of FIG. 3, the second set of vectors may be an example of the set of vectors 380 of FIG. 3, and the second segment mask 430 may be an example of the segment mask 385 of FIG. 3.

In some examples, the first set of vectors 410 may include embeddings from one or more encoders, such as text encoder 315-*a*, graph encoder 320, or dense neural network models 340, as described in FIG. 3. For instance, the first set of vectors 410 may include P text embeddings, one category embedding for each entity categorical data point, one graphical relationship embedding for each entity, which may be concatenated into a sequence. The first segment mask 415 may be generated and assigned values (e.g., integers) corresponding to the modalities of the first set of vectors 410. For example, the first segment mask 415 may include values to indicate whether each embedding of the first set of vectors 410 is from input data of a text data type (0), graphical relationship type (1), or one of the categories (e.g., 2, 3, 4), etc. If a modality is missing (e.g., if an entity does not have data of a given modality, category, or data type), the modality will not be represented in the first set of vectors 410, but through the use of the first segment mask 415, modeling and training will be unaffected. Such techniques may also allow the handling of missing or irregularly formatted data, which may improve prediction and event recommendation. The input vectors 405 may be input into multimodal Transformer 435 to generate an entity embedding 445. The multimodal Transformer may be an encoder that utilizes a multihead self-attention encoder to transform multimodal data associated with the entity into an entity embedding 445, which is an H-dimensional embedding that is included in a training vector 455 for training the sequential model 460.

In some examples, the second set of vectors 425 may include embeddings from one or more encoders, such as text encoder 315-b, image encoder 325, or dense neural network models 340, as described in FIG. 3. For instance, the second set of vectors 425 may include M text embeddings, and N image embeddings, each image embedding corresponding to a respective image from the event, which may be concatenated into a sequence. The second segment mask 430 may be generated and assigned values (e.g., integers) corresponding to the modalities of the second set of vectors 425. For example, the second segment mask 430 may include values to indicate whether each embedding of the second set of vectors 425 is from input data of a text data type (0), or image type (1), etc. If a modality is missing (e.g., if an event does not have data of a given modality or data type), the modality will not be represented in the first set of vectors 425, but through the use of the second segment mask 430, modeling and training will be unaffected. Such techniques may also allow the handling of missing or irregularly formatted data, which may improve prediction and event recommendation. The input vectors 420 may be input into multimodal Transformer 440 to generate one or more event embeddings 450, such as event embedding 450-a and event embedding 450-b. In some cases, each event embedding 450 corresponds to a respective event attended by the entity, and may be included in the training vector 455 in order of attendance by the entity. The multimodal Transformer may be an encoder that utilizes a multihead self-attention encoder to transform multimodal data associated with the entity into one or more event embeddings 450, which may be H-dimensional embeddings that is included in a training vector 455 for training the sequential model 460.

The training vector 455 that represents multimodal data from an entity and an event sequence of the entity may be input into the sequential model 460. The sequential model 460 may be a Transformer encoder model and may be used to model the sequence of events attended by a given entity. In some cases, the Transformer encoded may be a language model, and events may be treated as or represented by tokens and sequences of events attended may be treated as or represented by sentences. For each training vector 455, which is representative of an entity and corresponding events, the entity embedding 445 may be the first token in the sentence, followed by one or more event embeddings 450. According to some aspects, the sequential model 460 may be trained using a next-event prediction task.

According to some aspects, hierarchies and curriculum training techniques may be used to train the sequential model 460. For example, the higher (e.g., the coarser) the level in the hierarchy, the more training data that may be available, which may be used to train the sequential model 460. For example, there may be more attending data for an organization than an individual, and more data for an event than a session. Using a curriculum training technique, the sequential model 460 is initial trained on higher level sequences (e.g., sequences of organizations attending events), then trained on lower level sequences (e.g., sequences of individuals attending events, followed by a sequence of individuals attending tracks, and a sequence of individuals attending sessions).

In some examples, the sequential model 460 may be trained using different corpuses or datasets corresponding to different entity types or event types, which refine the sequential model 460 over time enabling more accurate prediction or event recommendation. In some cases, each corpus may include one or more vectors associated with the entity, an event sequence of the entity, or both.

Once trained, new data (e.g., data that was not used for training the sequential model 460, or data associated with a new entity, customer, or company) may be input into the sequential model 460, and the sequential model may generate a prediction for a next event based on entity data and optionally historical event attendance information.

Figure 5:
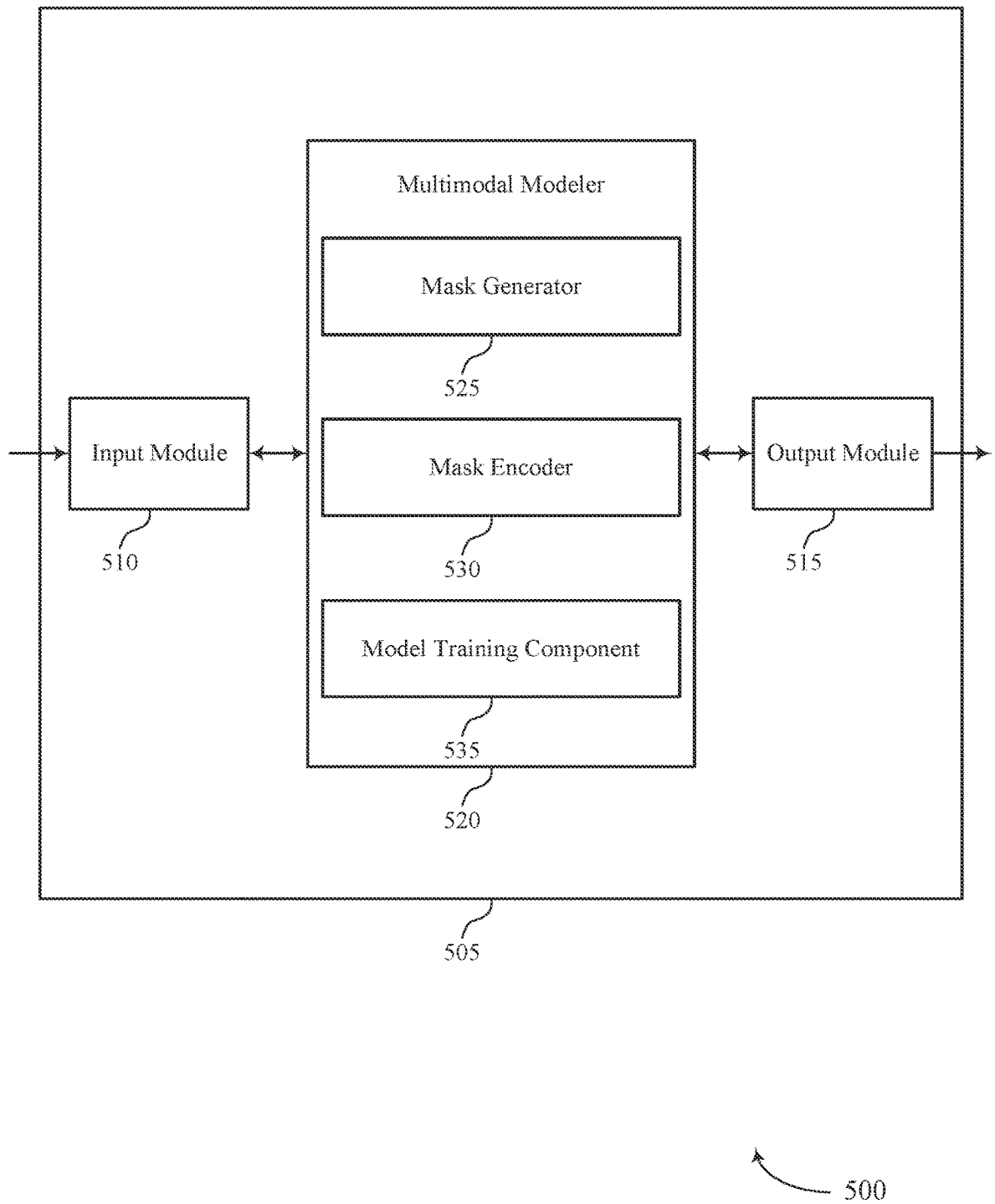
FIG. 5 shows a block diagram of an apparatus that supports event prediction based on multimodal learning in accordance with aspects of the present disclosure.

FIG. 5 shows a block diagram 500 of a device 505 that supports event prediction based on multimodal learning in accordance with aspects of the present disclosure. The device 505 may include an input module 510, an output module 515, and a multimodal modeler 520. The device 505 may also include a processor. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the Multimodal Modeler 720 to support event prediction based on multimodal learning. In some cases, the input module 510 may be a component of an input/output (I/O) controller 710 as described with reference to FIG. 7.

The output module 515 may manage output signals for the device 505. For example, the output module 515 may receive signals from other components of the device 505, such as the Multimodal Modeler 520, and may transmit these signals to other components or devices. In some specific examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the multimodal modeler 520 may include a mask generator 525, a mask encoder 530, a model training component 535, or any combination thereof. In some examples, the multimodal modeler 520, or various components thereof, may be configured to perform various operations (e.g., receiving, monitoring, transmitting) using or otherwise in cooperation with the input module 510, the output module 515, or both. For example, the multimodal modeler 520 may receive information from the input module 510, send information to the output module 515, or be integrated in combination with the input module 510, the output module 515, or both to receive information, transmit information, or perform various other operations as described herein.

The multimodal modeler 520 may support data processing in accordance with examples as disclosed herein. The mask generator 525 may be configured as or otherwise support a means for generating a first segment mask and a second segment mask, wherein the first segment mask and the second segment mask each indicates a differentiation between encoder modalities used to encode a first set of vectors associated with the first segment mask and a second set of vectors associated with the second segment mask. The mask encoder 530 may be configured as or otherwise support a means for encoding the first segment mask using a first multimodal model and the second segment mask using a second multimodal model to generate a set of training vectors, wherein each training vector of the set of training vectors comprises a first set of embeddings corresponding to an entity and a second set of embeddings corresponding to an event sequence associated with the entity. The model training component 535 may be configured as or otherwise support a means for training a sequential model using the set of training vectors.

Figure 6:
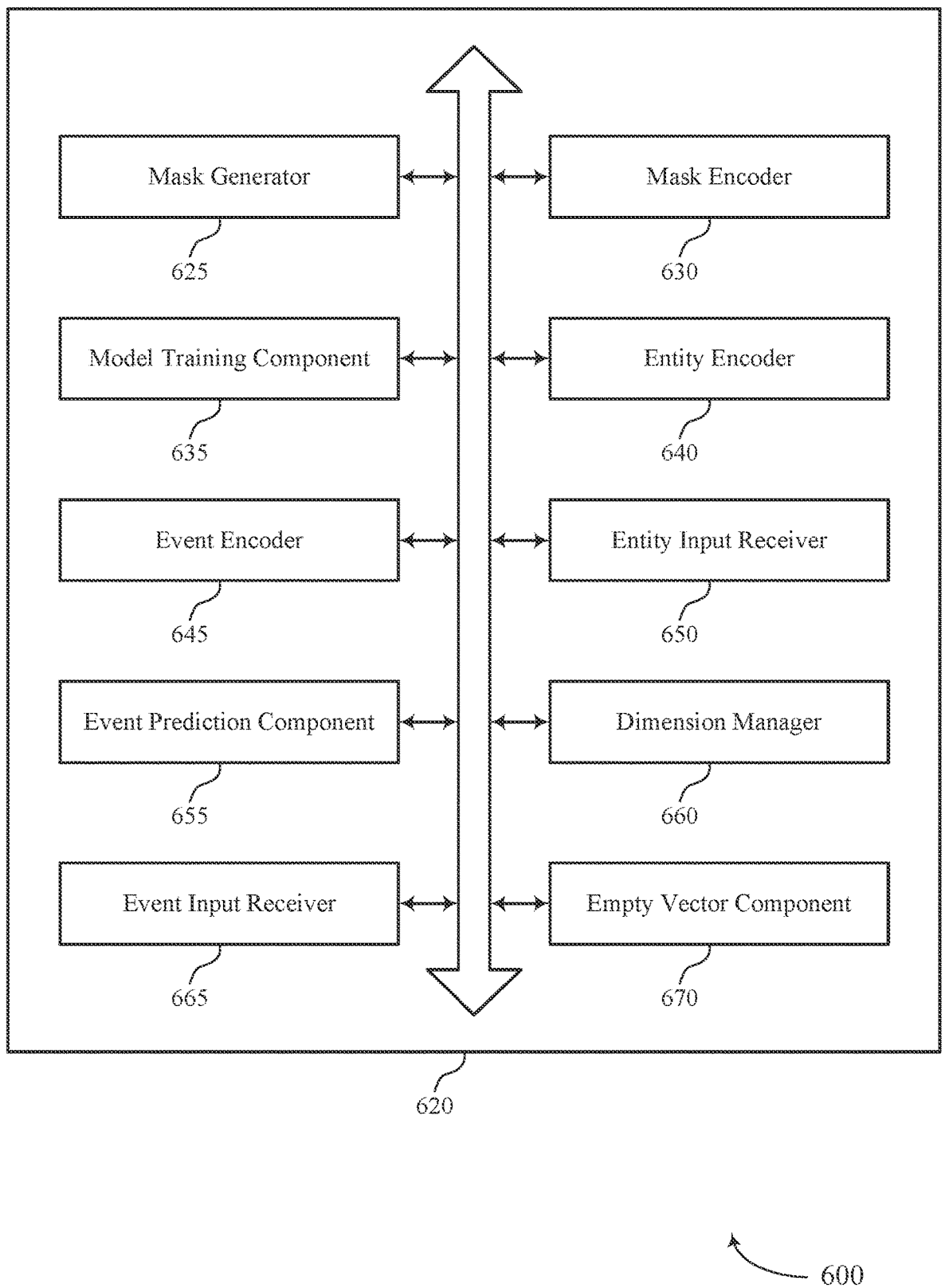
FIG. 6 shows a block diagram of a multimodal modeler that supports event prediction based on multimodal learning in accordance with aspects of the present disclosure.

FIG. 6 shows a block diagram 600 of a multimodal modeler 620 that supports event prediction based on multimodal learning in accordance with aspects of the present disclosure. The multimodal modeler 620 may be an example of aspects of a multimodal modeler or a multimodal modeler 520, or both, as described herein. The multimodal modeler 620, or various components thereof, may be an example of means for performing various aspects of event prediction based on multimodal learning as described herein. For example, the multimodal modeler 620 may include a mask generator 625, a mask encoder 630, a model training component 635, an entity encoder 640, an event encoder 645, an entity input receiver 650, an event prediction component 655, a dimension manager 660, an event input receiver 665, an empty vector component 670, or any combination thereof. Each of these components may communicate, directly or indirectly, with one another (e.g., via one or more buses).

The multimodal modeler 620 may support data processing in accordance with examples as disclosed herein. The mask generator 625 may be configured as or otherwise support a means for generating a first segment mask and a second segment mask, wherein the first segment mask and the second segment mask each indicates a differentiation between encoder modalities used to encode a first set of vectors associated with the first segment mask and a second set of vectors associated with the second segment mask. The mask encoder 630 may be configured as or otherwise support a means for encoding the first segment mask using a first multimodal model and the second segment mask using a second multimodal model to generate a set of training vectors, wherein each training vector of the set of training vectors comprises a first set of embeddings corresponding to an entity and a second set of embeddings corresponding to an event sequence associated with the entity. The model training component 635 may be configured as or otherwise support a means for training a sequential model using the set of training vectors.

In some examples, the entity encoder 640 may be configured as or otherwise support a means for encoding, using a first encoder for each of the first multimodal model and the second multimodal model, a first set of inputs of a first modality to generate a first subset of vectors of the first set of vectors and a first subset of vectors of the second set of vectors. In some examples, the event encoder 645 may be configured as or otherwise support a means for encoding, using at least a second encoder for each of the first multimodal model and the second multimodal model, a second set of inputs of a second modality to generate one or more vectors for each of the first multimodal model and the second multimodal model.

In some examples, the dimension manager 660 may be configured as or otherwise support a means for normalizing the one or more vectors for each of the first multimodal model and the second multimodal model to generate a second subset of vectors of the first set of vectors and a second subset of vectors of the second set of vectors, the second subset of vectors of the first set of vectors and the second subset of vectors of the second set of vectors each having a same dimension as a dimension of the first subset of vectors of the first set of vectors and the first subset of vectors of the second set of vectors.

In some examples, the dimension of the first subset of vectors for each of the first set of vectors and the second set of vectors is supported by at least one of the first multimodal model or the second multimodal model.

In some examples, the first multimodal model is trained on entity data and the second multimodal model is trained on event data, and the entity input receiver 650 may be configured as or otherwise support a means for receiving a set of inputs indicative of the entity, the set of inputs indicative of the entity having multiple modalities. In some examples, the first multimodal model is trained on entity data and the second multimodal model is trained on event data, and the event prediction component 655 may be configured as or otherwise support a means for predicting, using the trained sequential model, an event for the entity based at least in part on the set of inputs indicative of the entity.

In some examples, the event input receiver 665 may be configured as or otherwise support a means for receiving a set of inputs indicative of a set of events associated with an attendance by the entity, the set of inputs indicative of the set of events having multiple modalities. In some examples, the event prediction component 655 may be configured as or otherwise support a means for predicting, using the trained sequential model, a subsequent event for the entity based at least in part on the set of inputs indicative of the entity and the set of inputs indicative of the set of events.

In some examples, the mask generator 625 may be configured as or otherwise support a means for assigning, as part of generating the first segment mask, a first value to a first subset of the first set of vectors associated with the first segment mask, the first subset associated with a first modality. In some examples, the mask generator 625 may be configured as or otherwise support a means for assigning, as part of generating the first segment mask, a second value to a second subset of the first set of vectors associated with the first segment mask, the second subset associated with a second modality different from the first modality, wherein the first and second modalities correspond to different data types.

In some examples, each of the first and second sets of vectors is associated with multiple modalities. In some examples, each of the multiple modalities corresponds a respective data type comprising a text data type, a graphical relationship type, an image data type, a numeric data type, or any combination thereof.

In some examples, each vector subset of the first set of vectors and the second set of vectors is associated with a same dimension.

In some examples, the empty vector component 670 may be configured as or otherwise support a means for determining an empty vector subset of the first set of vectors or the second set of vectors, the empty vector subset corresponding to a first modality. In some examples, the empty vector component 670 may be configured as or otherwise support a means for determining a set of null values for the empty vector subset for including in a respective one of the first segment mask or the second segment mask, wherein a number of the set of null values corresponds to the same dimension.

In some examples, the model training component 635 may be configured as or otherwise support a means for training the sequential model using different corpuses corresponding to different entity types or event types, each corpus comprising one or more vectors associated with the entity.

Figure 7:
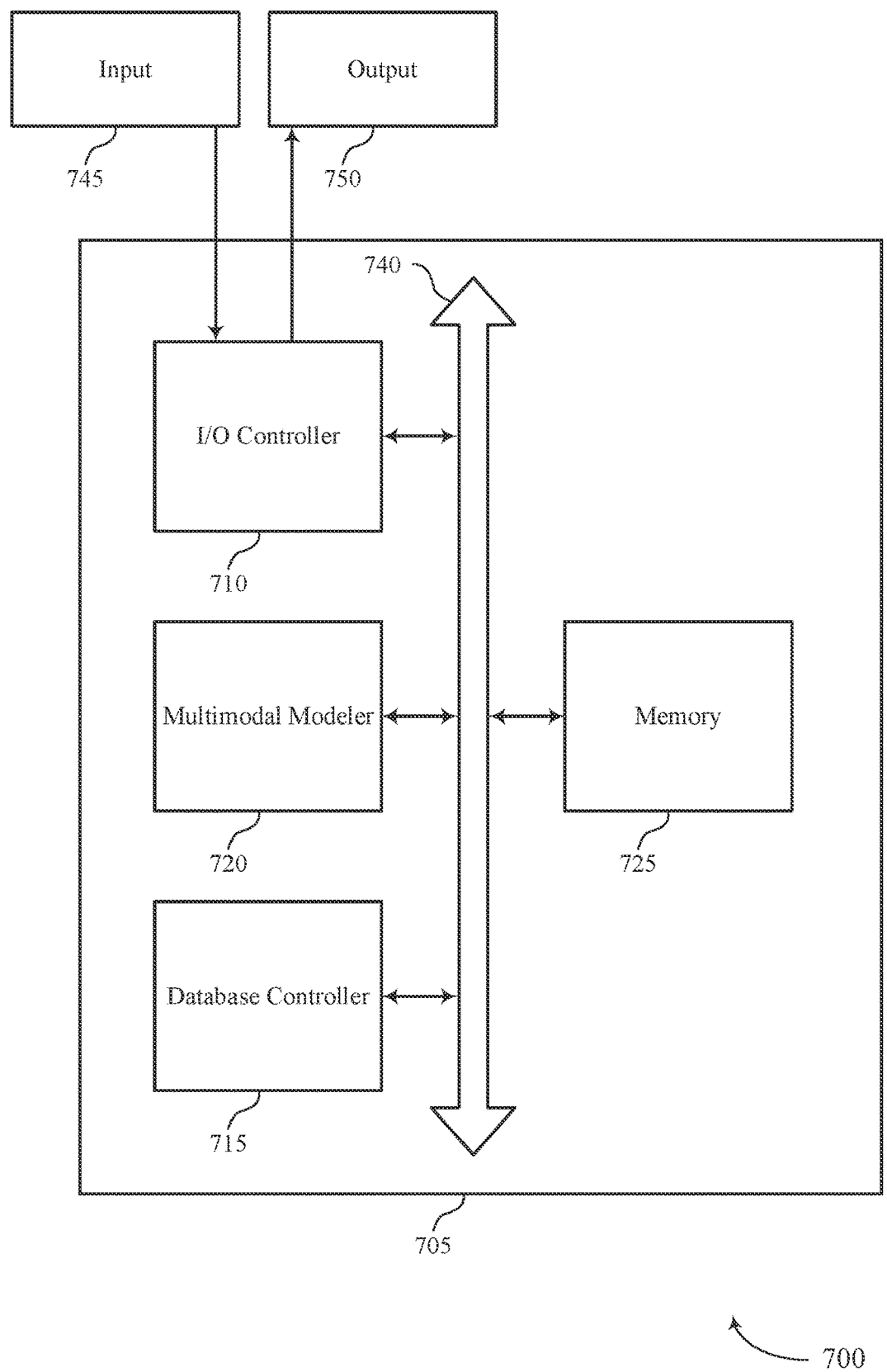
FIG. 7 shows a diagram of a system including a device that supports event prediction based on multimodal learning in accordance with aspects of the present disclosure.

FIG. 7 shows a diagram of a system 700 including a device 705 that supports event prediction based on multimodal learning in accordance with aspects of the present disclosure. The device 705 may be an example of or include the components of a device 505 as described herein. The device 705 may include components for data communications including components for transmitting and receiving communications, such as a multimodal modeler 720, an I/O controller 710, a database controller 715, a memory 725, a processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor. In some cases, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and read only memory (ROM). The memory 725 may store computer-readable, computer-executable software including instructions that, when executed, cause the processor to perform various functions described herein. In some cases, the memory 725 may contain, among other things, a basic I/O system (BIOS) which may control basic hardware or software operation such as the interaction with peripheral components or devices.

The processor 730 may include an intelligent hardware device, (e.g., a general-purpose processor, a digital signal processor (DSP), a central processing unit (CPU), a microcontroller, an application specific integrated circuit (ASIC), a field programmable gate array (FPGA), a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting event prediction based on multimodal learning).

The multimodal modeler 720 may support data processing in accordance with examples as disclosed herein. For example, the multimodal modeler 720 may be configured as or otherwise support a means for generating a first segment mask and a second segment mask, wherein the first segment mask and the second segment mask each indicates a differentiation between encoder modalities used to encode a first set of vectors associated with the first segment mask and a second set of vectors associated with the second segment mask. The multimodal modeler 720 may be configured as or otherwise support a means for encoding the first segment mask using a first multimodal model and the second segment mask using a second multimodal model to generate a set of training vectors, wherein each training vector of the set of training vectors comprises a first set of embeddings corresponding to an entity and a second set of embeddings corresponding to an event sequence associated with the entity. The multimodal modeler 720 may be configured as or otherwise support a means for training a sequential model using the set of training vectors.

By including or configuring the multimodal modeler 720 in accordance with examples as described herein, the device 705 may support techniques for improved event prediction or session recommendation for an entity, such as a customer (e.g., an individual or a company), which may result in a better experience for an attendee at an event or improved marketing content distribution and strategy. Such techniques may provide improved customer loyalty through accurate event or session prediction, higher attendance at planned or future events, and increased customer interest in hierarchical event sessions or tracks.

Figure 8:
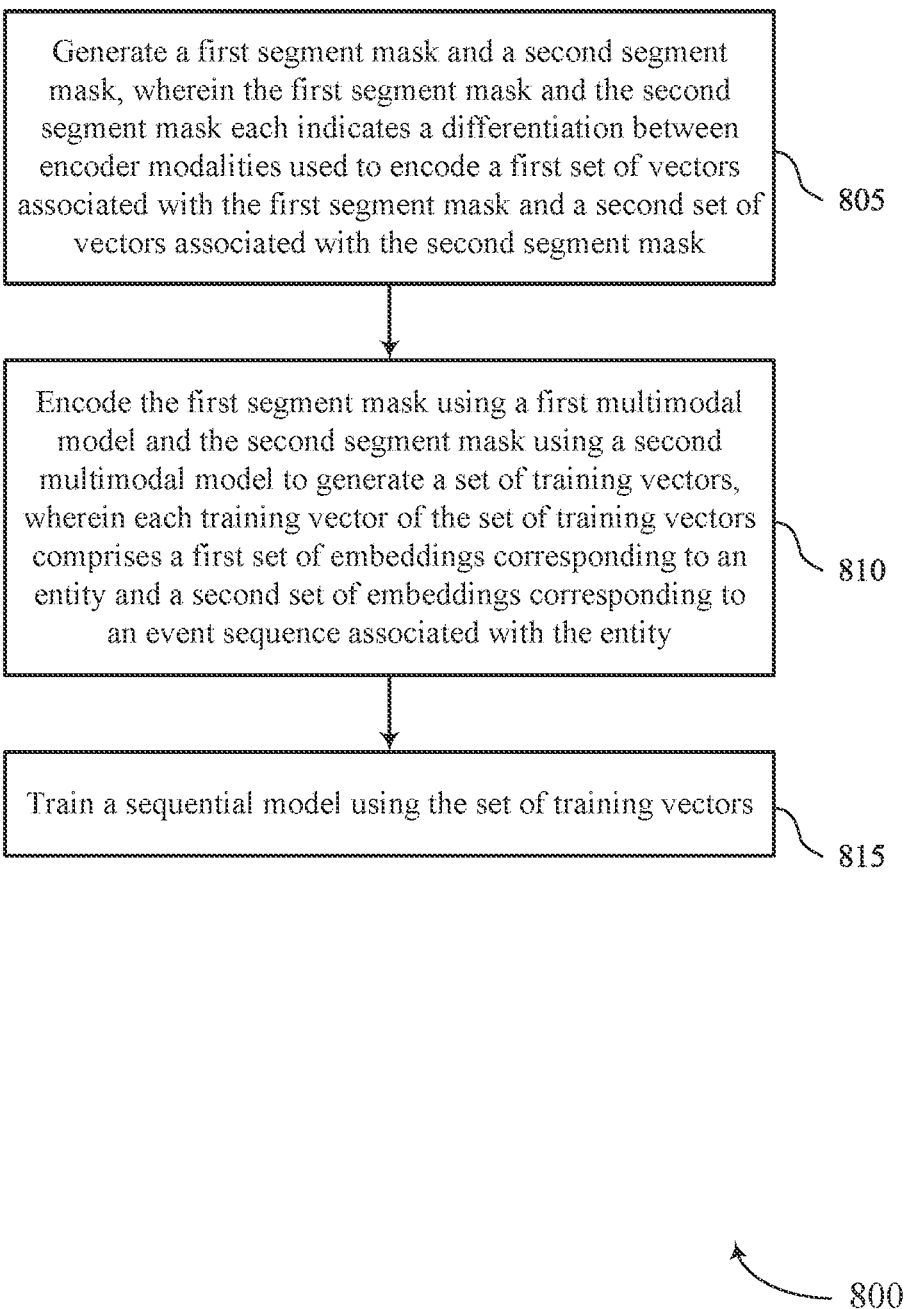
FIGS. 8 through 10 show flowcharts illustrating methods that support event prediction based on multimodal learning in accordance with aspects of the present disclosure.

FIG. 8 shows a flowchart illustrating a method 800 that supports event prediction based on multimodal learning in accordance with aspects of the present disclosure. The operations of the method 800 may be implemented by a Multimodal Modeler or its components as described herein. For example, the operations of the method 800 may be performed by a Multimodal Modeler as described with reference to FIGs. FIG. 1 through 7. In some examples, a Multimodal Modeler may execute a set of instructions to control the functional elements of the Multimodal Modeler to perform the described functions. Additionally or alternatively, the Multimodal Modeler may perform aspects of the described functions using special-purpose hardware.

At 805, the method may include generating a first segment mask and a second segment mask, wherein the first segment mask and the second segment mask each indicates a differentiation between encoder modalities used to encode a first set of vectors associated with the first segment mask and a second set of vectors associated with the second segment mask. The operations of 805 may be performed in accordance with examples as disclosed herein. In some examples, aspects of the operations of 805 may be performed by a mask generator 625 as described with reference to FIG. 6.

At 810, the method may include encoding the first segment mask using a first multimodal model and the second segment mask using a second multimodal model to generate a set of training vectors, wherein each training vector of the set of training vectors comprises a first set of embeddings corresponding to an entity and a second set of embeddings corresponding to an event sequence associated with the entity. The operations of 810 may be performed in accordance with examples as disclosed herein. In some examples, aspects of the operations of 810 may be performed by a mask encoder 630 as described with reference to FIG. 6.

At 815, the method may include training a sequential model using the set of training vectors. The operations of 815 may be performed in accordance with examples as disclosed herein. In some examples, aspects of the operations of 815 may be performed by a model training component 635 as described with reference to FIG. 6.

Figure 9:
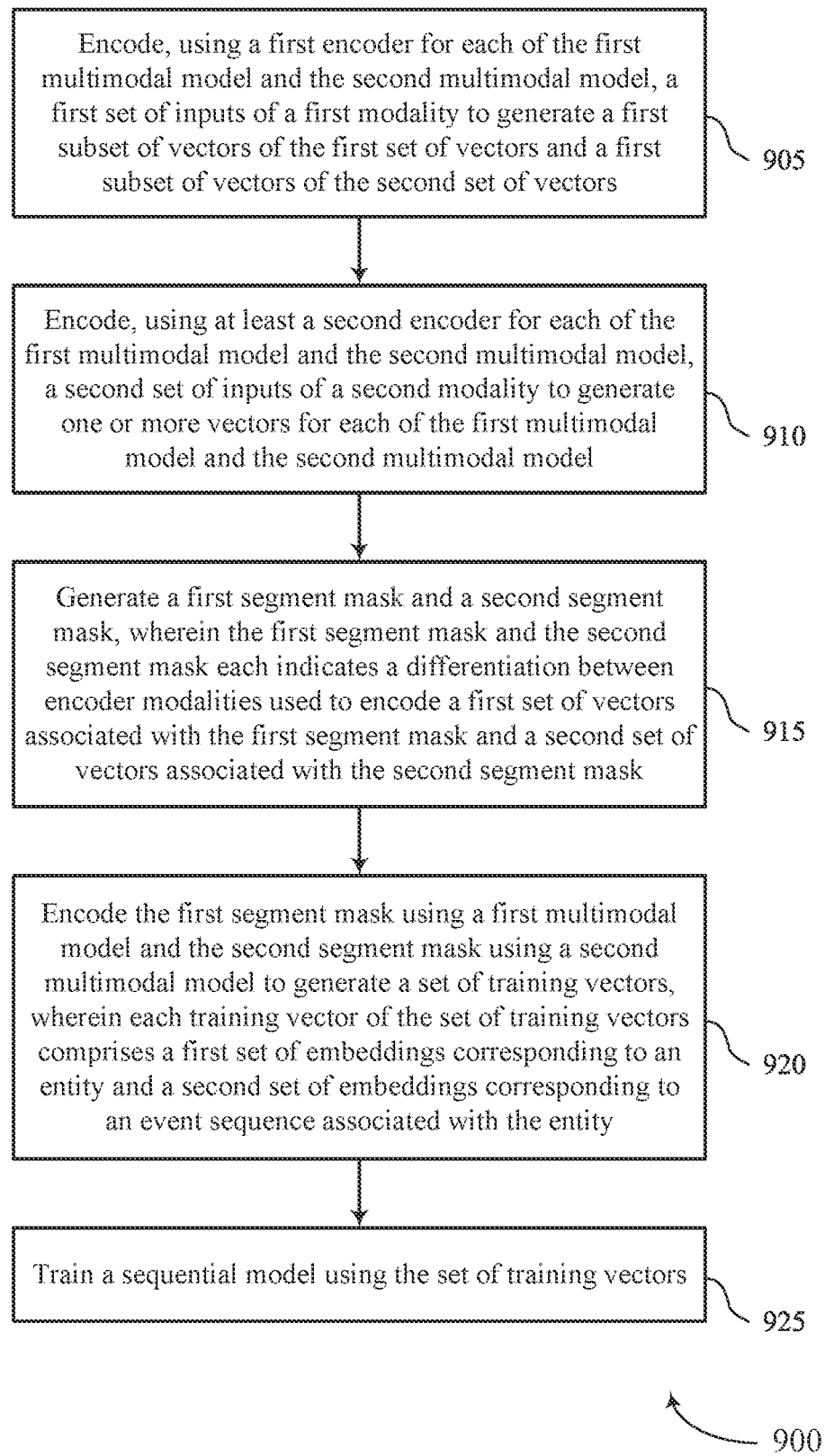

FIG. 9 shows a flowchart illustrating a method 900 that supports event prediction based on multimodal learning in accordance with aspects of the present disclosure. The operations of the method 900 may be implemented by a Multimodal Modeler or its components as described herein. For example, the operations of the method 900 may be performed by a Multimodal Modeler as described with reference to FIGs. FIG. 1 through 7. In some examples, a Multimodal Modeler may execute a set of instructions to control the functional elements of the Multimodal Modeler to perform the described functions. Additionally or alternatively, the Multimodal Modeler may perform aspects of the described functions using special-purpose hardware.

At 905, the method may include encoding, using a first encoder for each of the first multimodal model and the second multimodal model, a first set of inputs of a first modality to generate a first subset of vectors of the first set of vectors and a first subset of vectors of the second set of vectors. The operations of 905 may be performed in accordance with examples as disclosed herein. In some examples, aspects of the operations of 905 may be performed by an entity encoder 640 as described with reference to FIG. 6.

At 910, the method may include encoding, using at least a second encoder for each of the first multimodal model and the second multimodal model, a second set of inputs of a second modality to generate one or more vectors for each of the first multimodal model and the second multimodal model. The operations of 910 may be performed in accordance with examples as disclosed herein. In some examples, aspects of the operations of 910 may be performed by an event encoder 645 as described with reference to FIG. 6.

At 915, the method may include generating a first segment mask and a second segment mask, wherein the first segment mask and the second segment mask each indicates a differentiation between encoder modalities used to encode a first set of vectors associated with the first segment mask and a second set of vectors associated with the second segment mask. The operations of 915 may be performed in accordance with examples as disclosed herein. In some examples, aspects of the operations of 915 may be performed by a mask generator 625 as described with reference to FIG. 6.

At 920, the method may include encoding the first segment mask using a first multimodal model and the second segment mask using a second multimodal model to generate a set of training vectors, wherein each training vector of the set of training vectors comprises a first set of embeddings corresponding to an entity and a second set of embeddings corresponding to an event sequence associated with the entity. The operations of 920 may be performed in accordance with examples as disclosed herein. In some examples, aspects of the operations of 920 may be performed by a mask encoder 630 as described with reference to FIG. 6.

At 925, the method may include training a sequential model using the set of training vectors. The operations of 925 may be performed in accordance with examples as disclosed herein. In some examples, aspects of the operations of 925 may be performed by a model training component 635 as described with reference to FIG. 6.

Figure 10:
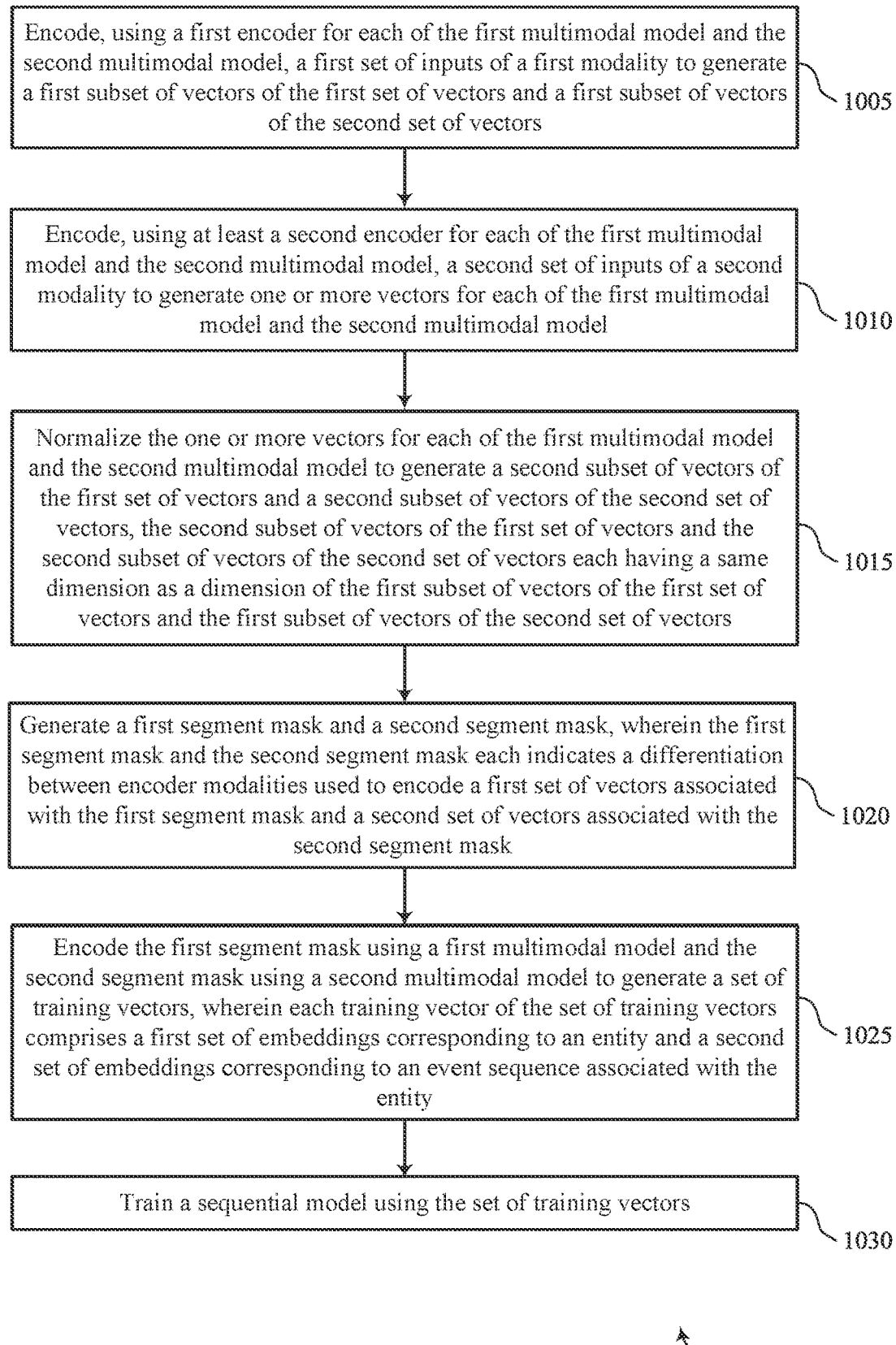

FIG. 10 shows a flowchart illustrating a method 1000 that supports event prediction based on multimodal learning in accordance with aspects of the present disclosure. The operations of the method 1000 may be implemented by a Multimodal Modeler or its components as described herein. For example, the operations of the method 1000 may be performed by a Multimodal Modeler as described with reference to FIGs. FIG. 1 through 7. In some examples, a Multimodal Modeler may execute a set of instructions to control the functional elements of the Multimodal Modeler to perform the described functions. Additionally or alternatively, the Multimodal Modeler may perform aspects of the described functions using special-purpose hardware.

At 1005, the method may include encoding, using a first encoder for each of the first multimodal model and the second multimodal model, a first set of inputs of a first modality to generate a first subset of vectors of the first set of vectors and a first subset of vectors of the second set of vectors. The operations of 1005 may be performed in accordance with examples as disclosed herein. In some examples, aspects of the operations of 1005 may be performed by an entity encoder 640 as described with reference to FIG. 6.

At 1010, the method may include encoding, using at least a second encoder for each of the first multimodal model and the second multimodal model, a second set of inputs of a second modality to generate one or more vectors for each of the first multimodal model and the second multimodal model. The operations of 1010 may be performed in accordance with examples as disclosed herein. In some examples, aspects of the operations of 1010 may be performed by an event encoder 645 as described with reference to FIG. 6.

At 1015, the method may include normalizing the one or more vectors for each of the first multimodal model and the second multimodal model to generate a second subset of vectors of the first set of vectors and a second subset of vectors of the second set of vectors, the second subset of vectors of the first set of vectors and the second subset of vectors of the second set of vectors each having a same dimension as a dimension of the first subset of vectors of the first set of vectors and the first subset of vectors of the second set of vectors. The operations of 1015 may be performed in accordance with examples as disclosed herein. In some examples, aspects of the operations of 1015 may be performed by a dimension manager 660 as described with reference to FIG. 6.

At 1020, the method may include generating a first segment mask and a second segment mask, wherein the first segment mask and the second segment mask each indicates a differentiation between encoder modalities used to encode a first set of vectors associated with the first segment mask and a second set of vectors associated with the second segment mask. The operations of 1020 may be performed in accordance with examples as disclosed herein. In some examples, aspects of the operations of 1020 may be performed by a mask generator 625 as described with reference to FIG. 6.

At 1025, the method may include encoding the first segment mask using a first multimodal model and the second segment mask using a second multimodal model to generate a set of training vectors, wherein each training vector of the set of training vectors comprises a first set of embeddings corresponding to an entity and a second set of embeddings corresponding to an event sequence associated with the entity. The operations of 1025 may be performed in accordance with examples as disclosed herein. In some examples, aspects of the operations of 1025 may be performed by a mask encoder 630 as described with reference to FIG. 6.

At 1030, the method may include training a sequential model using the set of training vectors. The operations of 1030 may be performed in accordance with examples as disclosed herein. In some examples, aspects of the operations of 1030 may be performed by a model training component 635 as described with reference to FIG. 6.

A method for data processing is described. The method may include generating a first segment mask and a second segment mask, wherein the first segment mask and the second segment mask each indicates a differentiation between encoder modalities used to encode a first set of vectors associated with the first segment mask and a second set of vectors associated with the second segment mask, encoding the first segment mask using a first multimodal model and the second segment mask using a second multimodal model to generate a set of training vectors, wherein each training vector of the set of training vectors comprises a first set of embeddings corresponding to an entity and a second set of embeddings corresponding to an event sequence associated with the entity, and training a sequential model using the set of training vectors.

An apparatus for data processing is described. The apparatus may include a processor, memory in electronic communication with the processor, and instructions stored in the memory. The instructions may be executable by the processor to cause the apparatus to generate a first segment mask and a second segment mask, wherein the first segment mask and the second segment mask each indicates a differentiation between encoder modalities used to encode a first set of vectors associated with the first segment mask and a second set of vectors associated with the second segment mask, encode the first segment mask using a first multimodal model and the second segment mask using a second multimodal model to generate a set of training vectors, wherein each training vector of the set of training vectors comprises a first set of embeddings corresponding to an entity and a second set of embeddings corresponding to an event sequence associated with the entity, and train a sequential model using the set of training vectors.

Another apparatus for data processing is described. The apparatus may include means for generating a first segment mask and a second segment mask, wherein the first segment mask and the second segment mask each indicates a differentiation between encoder modalities used to encode a first set of vectors associated with the first segment mask and a second set of vectors associated with the second segment mask, means for encoding the first segment mask using a first multimodal model and the second segment mask using a second multimodal model to generate a set of training vectors, wherein each training vector of the set of training vectors comprises a first set of embeddings corresponding to an entity and a second set of embeddings corresponding to an event sequence associated with the entity, and means for training a sequential model using the set of training vectors.

A non-transitory computer-readable medium storing code for data processing is described. The code may include instructions executable by a processor to generate a first segment mask and a second segment mask, wherein the first segment mask and the second segment mask each indicates a differentiation between encoder modalities used to encode a first set of vectors associated with the first segment mask and a second set of vectors associated with the second segment mask, encode the first segment mask using a first multimodal model and the second segment mask using a second multimodal model to generate a set of training vectors, wherein each training vector of the set of training vectors comprises a first set of embeddings corresponding to an entity and a second set of embeddings corresponding to an event sequence associated with the entity, and train a sequential model using the set of training vectors.

In some examples of the method, apparatuses, and non-transitory computer-readable medium described herein, encoding, using a first encoder for each of the first multimodal model and the second multimodal model, a first set of inputs of a first modality to generate a first subset of vectors of the first set of vectors and a first subset of vectors of the second set of vectors and encoding, using at least a second encoder for each of the first multimodal model and the second multimodal model, a second set of inputs of a second modality to generate one or more vectors for each of the first multimodal model and the second multimodal model.

Some examples of the method, apparatuses, and non-transitory computer-readable medium described herein may further include operations, features, means, or instructions for normalizing the one or more vectors for each of the first multimodal model and the second multimodal model to generate a second subset of vectors of the first set of vectors and a second subset of vectors of the second set of vectors, the second subset of vectors of the first set of vectors and the second subset of vectors of the second set of vectors each having a same dimension as a dimension of the first subset of vectors of the first set of vectors and the first subset of vectors of the second set of vectors.

In some examples of the method, apparatuses, and non-transitory computer-readable medium described herein, the dimension of the first subset of vectors for each of the first set of vectors and the second set of vectors may be supported by at least one of the first multimodal model or the second multimodal model.

In some examples of the method, apparatuses, and non-transitory computer-readable medium described herein, the first multimodal model may be trained on entity data and the second multimodal model may be trained on event data and the method, apparatuses, and non-transitory computer-readable medium may include further operations, features, means, or instructions for receiving a set of inputs indicative of the entity, the set of inputs indicative of the entity having multiple modalities and predicting, using the trained sequential model, an event for the entity based at least in part on the set of inputs indicative of the entity.

Some examples of the method, apparatuses, and non-transitory computer-readable medium described herein may further include operations, features, means, or instructions for receiving a set of inputs indicative of a set of events associated with an attendance by the entity, the set of inputs indicative of the set of events having multiple modalities and predicting, using the trained sequential model, a subsequent event for the entity based at least in part on the set of inputs indicative of the entity and the set of inputs indicative of the set of events.

Some examples of the method, apparatuses, and non-transitory computer-readable medium described herein may further include operations, features, means, or instructions for assigning, as part of generating the first segment mask, a first value to a first subset of the first set of vectors associated with the first segment mask, the first subset associated with a first modality and assigning, as part of generating the first segment mask, a second value to a second subset of the first set of vectors associated with the first segment mask, the second subset associated with a second modality different from the first modality, wherein the first and second modalities correspond to different data types.

In some examples of the method, apparatuses, and non-transitory computer-readable medium described herein, each of the first and second sets of vectors may be associated with multiple modalities and each of the multiple modalities corresponds a respective data type comprising a text data type, a graphical relationship type, an image data type, a numeric data type, or any combination thereof.

In some examples of the method, apparatuses, and non-transitory computer-readable medium described herein, each vector subset of the first set of vectors and the second set of vectors may be associated with a same dimension.

Some examples of the method, apparatuses, and non-transitory computer-readable medium described herein may further include operations, features, means, or instructions for determining an empty vector subset of the first set of vectors or the second set of vectors, the empty vector subset corresponding to a first modality and determining a set of null values for the empty vector subset for including in a respective one of the first segment mask or the second segment mask, wherein a number of the set of null values corresponds to the same dimension.

Some examples of the method, apparatuses, and non-transitory computer-readable medium described herein may further include operations, features, means, or instructions for training the sequential model using different corpuses corresponding to different entity types or event types, each corpus comprising one or more vectors associated with the entity.

It should be noted that the methods described above describe possible implementations, and that the operations and the steps may be rearranged or otherwise modified and that other implementations are possible. Further aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
generating a first segment mask and a second segment mask, the first segment mask including a first set of values indicating a differentiation between encoder modalities used to encode each vector of a first set of vectors associated with an entity into a common dimension and the second segment mask including a second set of values indicating the differentiation between the encoder modalities used to encode each vector of a second set of vectors associated with an event sequence into the common dimension, wherein respective values of the first set of values and the second set of values are indicative of a respective data type of input data and a respective encoder type of a plurality of encoder types used to generate a corresponding vector of the first set of vectors, a corresponding vector of the second set of vectors, or both, and wherein each respective value of the first set of values and the second set of values is indicative of the respective encoder type associated with a corresponding encoder modality configured for encoding the respective data type of the input data;
encoding the first set of vectors using a first multimodal model transformer based at least in part on the first set of values of the first segment mask indicating the respective data type of each vector of the first set of vectors and the second set of vectors using a second multimodal model transformer based at least in part on the second set of values of the second segment mask indicating the respective data type of each vector of the second set of vectors to generate a set of training vectors, wherein a respective training vector of the set of training vectors comprises a first set of embeddings corresponding to a first entity and a second set of embeddings corresponding to a first event sequence associated with the first entity, and wherein the first set of embeddings are associated with the first set of vectors and the second set of embeddings are associated with the second set of vectors;
training a sequential model using the set of training vectors that comprises encoded vectors from two or more encoder modalities based at least in part on utilization of the first segment mask and the second segment mask, wherein the training results in modeling of respective sequences of events for one or more entities, and wherein the modeling of the respective sequences of events is irrespective of an encoder type and a corresponding encoder modality used to encode events of the respective sequences of events or entities of the one or more entities; and
generating, using the trained sequential model and based at least in part on a set of inputs associated with a respective entity, a set of event recommendations for the respective entity.

2. The method of claim 1, further comprising:
encoding, using a first encoder for each of the first multimodal model transformer and the second multimodal model transformer, a first set of inputs of a first modality to generate a first subset of vectors of the first set of vectors and a first subset of vectors of the second set of vectors, the first encoder being associated with a first encoder type of the plurality of encoder types; and
encoding, using at least a second encoder for each of the first multimodal model transformer and the second multimodal model transformer, a second set of inputs of a second modality to generate one or more vectors for each of the first multimodal model transformer and the second multimodal model transformer, the second encoder being associated with a second encoder type of the plurality of encoder types.

3. The method of claim 2, further comprising:
normalizing the one or more vectors for each of the first multimodal model transformer and the second multimodal model transformer to generate a second subset of vectors of the first set of vectors and a second subset of vectors of the second set of vectors, the second subset of vectors of the first set of vectors and the second subset of vectors of the second set of vectors each having a same dimension as a dimension of the first subset of vectors of the first set of vectors and the first subset of vectors of the second set of vectors, wherein the same dimension is the common dimension.

4. The method of claim 3, wherein the common dimension of the first subset of vectors for each vector of the first set of vectors and the second set of vectors is supported by at least one of the first multimodal model transformer or the second multimodal model transformer.

5. The method of claim 1, wherein the first multimodal model transformer is trained on entity data and the second multimodal model transformer is trained on event data, the method further comprising:
receiving a set of inputs indicative of the entity, the set of inputs indicative of the entity having multiple modalities; and
predicting, using the trained sequential model, an event for the entity based at least in part on the set of inputs indicative of the entity, wherein the set of event recommendations comprises the event.

6. The method of claim 5, further comprising:
receiving a set of inputs indicative of a set of events associated with an attendance by the entity, the set of inputs indicative of the set of events having multiple modalities, wherein the multiple modalities correspond to different data types of input data; and
predicting, using the trained sequential model, a subsequent event for the entity based at least in part on the set of inputs indicative of the entity and the set of inputs indicative of the set of events, wherein the set of event recommendations comprises the subsequent event.

7. The method of claim 1, further comprising:
assigning, as part of generating the first segment mask, a first value of the first set of values to a first subset of the first set of vectors associated with the first segment mask, the first subset associated with a first modality that corresponds to a first data type of input data and a first encoder type of the plurality of encoder types; and
assigning, as part of generating the first segment mask, a second value of the first set of values to a second subset of the first set of vectors associated with the first segment mask, the second subset associated with a second modality that corresponds to a second data type of input data and a second encoder type of the plurality of encoder types that is different from the first modality, wherein the first data type and the second data type correspond to different data types and the first encoder type and the second encoder type correspond to different encoder types, and wherein the first encoder type is associated with the first data type and the second encoder type is associated with the second data type.

8. The method of claim 1, wherein:
each vector of the first and second sets of vectors are associated with multiple modalities and multiple encoder types from the plurality of encoder types; and
each modality of the multiple modalities and each encoder type of the plurality of encoder types corresponds a respective data type of input data comprising a text data type, a graphical relationship type, an image data type, a numeric data type, or any combination thereof.

9. The method of claim 1, wherein each vector subset of the first set of vectors and the second set of vectors is associated with the common dimension.

10. The method of claim 9, further comprising:
determining an empty vector subset of the first set of vectors or the second set of vectors, the empty vector subset corresponding to a first modality; and
determining a set of null values for the empty vector subset for including in a respective one of the first segment mask or the second segment mask, wherein a number of the set of null values corresponds to the common dimension.

11. The method of claim 1, further comprising:
training the sequential model using different corpuses corresponding to different entity types or event types, each corpus comprising one or more vectors associated with the entity.

12. An apparatus for data processing, comprising:
one or more processors;
one or more memories coupled with the one or more processors; and
instructions stored in the one or more memories and executable by the one or more processors to cause the apparatus to:
generate a first segment mask and a second segment mask, the first segment mask including a first set of values indicating a differentiation between encoder modalities used to encode each vector of a first set of vectors associated with an entity into a common dimension and the second segment mask including a second set of values indicating the differentiation between the encoder modalities used to encode each vector of a second set of vectors associated with an event sequence into the common dimension, wherein respective values of the first set of values and the second set of values are indicative of a respective data type of input data and a respective encoder type of a plurality of encoder types used to generate a corresponding vector of the first set of vectors, a corresponding vector of the second set of vectors, or both, and wherein each respective value of the first set of values and the second set of values is indicative of the respective encoder type associated with a corresponding encoder modality configured for encoding the respective data type of the input data;
encode the first set of vectors using a first multimodal model transformer based at least in part on the first set of values of the first segment mask indicating the respective data type of each vector of the first set of vectors and the second set of vectors using a second multimodal model transformer based at least in part on the second set of values of the second segment mask indicating the respective data type of each vector of the second set of vectors to generate a set of training vectors, wherein a respective training vector of the set of training vectors comprises a first set of embeddings corresponding to a first entity and a second set of embeddings corresponding to a first event sequence associated with the first entity, and wherein the first set of embeddings are associated with the first set of vectors and the second set of embeddings are associated with the second set of vectors;
train a sequential model using the set of training vectors that comprises encoded vectors from two or more encoder modalities based at least in part on utilization of the first segment mask and the second segment mask, wherein the training results in modeling of respective sequences of events for one or more entities, and wherein the modeling of the respective sequences of events is irrespective of an encoder type and a corresponding encoder modality used to encode events of the respective sequences of events or entities of the one or more entities; and
generate, using the trained sequential model and based at least in part on a set of inputs associated with a respective entity, a set of event recommendations for the respective entity.

13. The apparatus of claim 12, wherein the instructions are further executable by the one or more processors to cause the apparatus to:
encode, using a first encoder for each of the first multimodal model transformer and the second multimodal model transformer, a first set of inputs of a first modality to generate a first subset of vectors of the first set of vectors and a first subset of vectors of the second set of vectors, the first encoder being associated with a first encoder type of the plurality of encoder types; and
encode, using at least a second encoder for each of the first multimodal model transformer and the second multimodal model transformer, a second set of inputs of a second modality to generate one or more vectors for each of the first multimodal model transformer and the second multimodal model transformer, the second encoder being associated with a second encoder type of the plurality of encoder types.

14. The apparatus of claim 13, wherein the instructions are further executable by the one or more processors to cause the apparatus to:
normalize the one or more vectors for each of the first multimodal model transformer and the second multimodal model transformer to generate a second subset of vectors of the first set of vectors and a second subset of vectors of the second set of vectors, the second subset of vectors of the first set of vectors and the second subset of vectors of the second set of vectors each having a same dimension as a dimension of the first subset of vectors of the first set of vectors and the first subset of vectors of the second set of vectors, wherein the same dimension is the common dimension.

15. The apparatus of claim 14, wherein the common dimension of the first subset of vectors for each vector of the first set of vectors and the second set of vectors is supported by at least one of the first multimodal model transformer or the second multimodal model transformer.

16. The apparatus of claim 12, wherein the first multimodal model transformer is trained on entity data and the second multimodal model transformer is trained on event data, and the instructions are further executable by the one or more processors to cause the apparatus to:
receive a set of inputs indicative of the entity, the set of inputs indicative of the entity having multiple modalities; and
predict, using the trained sequential model, an event for the entity based at least in part on the set of inputs indicative of the entity, wherein the set of event recommendations comprises the event.

17. The apparatus of claim 16, wherein the instructions are further executable by the one or more processors to cause the apparatus to:
receive a set of inputs indicative of a set of events associated with an attendance by the entity, the set of inputs indicative of the set of events having multiple modalities, wherein the multiple modalities correspond to different data types of input data; and
predict, using the trained sequential model, a subsequent event for the entity based at least in part on the set of inputs indicative of the entity and the set of inputs indicative of the set of events, wherein the set of event recommendations comprises the subsequent event.

18. The apparatus of claim 12, wherein the instructions are further executable by the one or more processors to cause the apparatus to:
assign, as part of generating the first segment mask, a first value of the first set of values to a first subset of the first set of vectors associated with the first segment mask, the first subset associated with a first modality that corresponds to a first data type of input data and a first encoder type of the plurality of encoder types; and
assign, as part of generating the first segment mask, a second value of the first set of values to a second subset of the first set of vectors associated with the first segment mask, the second subset associated with a second modality that corresponds to a second data type of input data and a second encoder type of the plurality of encoder types that is different from the first modality, wherein the first data type and the second data type correspond to different data types and the first encoder type and the second encoder type correspond to different encoder types, and wherein the first encoder type is associated with the first data type and the second encoder type is associated with the second data type.

19. The apparatus of claim 12, wherein:
each vector of the first and second sets of vectors are associated with multiple modalities and multiple encoder types from the plurality encoder types; and
each modality of the multiple modalities and each encoder type of the plurality of encoder types corresponds a respective data type of input data comprising a text data type, a graphical relationship type, an image data type, a numeric data type, or any combination thereof.

20. A non-transitory computer-readable medium storing code for data processing, the code comprising instructions executable by one or more processors to:
generate a first segment mask and a second segment mask, the first segment mask including a first set of values indicating a differentiation between encoder modalities used to encode each vector of a first set of vectors associated with an entity into a common dimension and the second segment mask including a second set of values indicating the differentiation between the encoder modalities used to encode each vector of a second set of vectors associated with an event sequence into the common dimension, wherein respective values of the first set of values and the second set of values are indicative of a respective data type of input data and a respective encoder type of a plurality of encoder types used to generate a corresponding vector of the first set of vectors, a corresponding vector of the second set of vectors, or both, and wherein each respective value of the first set of values and the second set of values is indicative of the respective encoder type associated with a corresponding encoder modality configured for encoding the respective data type of the input data;
encode the first set of vectors using a first multimodal model transformer based at least in part on the first set of values of the first segment mask indicating the respective data type of each vector of the first set of vectors and the second set of vectors using a second multimodal model transformer based at least in part on the second set of values of the second segment mask indicating the respective data type of each vector of the second set of vectors to generate a set of training vectors, wherein a respective training vector of the set of training vectors comprises a first set of embeddings corresponding to a first entity and a second set of embeddings corresponding to a first event sequence associated with the first entity, and wherein the first set of embeddings are associated with the first set of vectors and the second set of embeddings are associated with the second set of vectors;
train a sequential model using the set of training vectors that comprises encoded vectors from two or more encoder modalities based at least in part on utilization of the first segment mask and the second segment mask, wherein the training results in modeling of respective sequences of events for one or more entities, and wherein the modeling of the respective sequences of events is irrespective of an encoder type and a corresponding encoder modality used to encode events of the respective sequences of events or entities of the one or more entities; and
generate, using the trained sequential model and based at least in part on a set of inputs associated with a respective entity, a set of event recommendations for the respective entity.

* * * * *